United States Patent
Jiang et al.

(10) Patent No.: US 9,830,452 B2
(45) Date of Patent: Nov. 28, 2017

(54) SCANNING DEVICE, CLOUD MANAGEMENT DEVICE, METHOD AND SYSTEM FOR CHECKING AND KILLING MALICIOUS PROGRAMS

(71) Applicant: BEIJING QIHOO TECHNOLOGY COMPANY LIMITED, Beijing (CN)

(72) Inventors: Aijun Jiang, Beijing (CN); Zhifeng Liu, Beijing (CN); Qinglong Kong, Beijing (CN); Bo Zhang, Beijing (CN); Tong Yao, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 17 days.

(21) Appl. No.: 14/648,298

(22) PCT Filed: Nov. 29, 2013

(86) PCT No.: PCT/CN2013/088196
§ 371 (c)(1),
(2) Date: May 29, 2015

(87) PCT Pub. No.: WO2014/082599
PCT Pub. Date: Jun. 5, 2014

(65) Prior Publication Data
US 2015/0317479 A1   Nov. 5, 2015

(30) Foreign Application Priority Data

Nov. 30, 2012 (CN) .......................... 2012 1 0506137
Nov. 30, 2012 (CN) .......................... 2012 1 0506185

(51) Int. Cl.
*G06F 21/00* (2013.01)
*G06F 21/56* (2013.01)
*H04L 29/06* (2006.01)

(52) U.S. Cl.
CPC ............ *G06F 21/56* (2013.01); *H04L 63/145* (2013.01); *G06F 2221/033* (2013.01)

(58) Field of Classification Search
CPC ...................................................... G06F 21/56
See application file for complete search history.

(56) References Cited

U.S. PATENT DOCUMENTS 8,302,192 B1 * 10/2012 Cnudde ................. H04L 63/145
726/22
8,505,102 B1 *  8/2013 Cannings .............. H04L 63/145
713/187

(Continued)

OTHER PUBLICATIONS

Mihai, C. et al., English abstract only of Chinese application No. CN1766779A, Document stamping antivirus manifest, publication date May 3, 2006, one page.

(Continued)

*Primary Examiner* — Morshed Mehedi
(74) *Attorney, Agent, or Firm* — Polsinelli PC (57) ABSTRACT

The invention discloses a scanning device, a cloud management device, a method and system for checking and killing a malicious program. Therein, a cloud management device for checking and killing a malicious program comprises: a second transmission interface; a first indicator configured to generate a first scanning content indication according to characteristics of a newborn malicious program and system environment information transmitted by a client device; a first matcher configured to obtain via the second transmission interface feature data of the unknown program file transmitted by the client device, and hereby perform matching in known records of feature data of malicious programs; and a second indicator configured to generate a second scanning content indication when the first matcher fails to match to a known record, the second scanning content indication comprising scanning a specified attribute of the (Continued)

unknown program file and/or a specified attribute of the contextual environment of the unknown program file, and transmit the same to the client device through the second transmission interface.

6 Claims, 4 Drawing Sheets

(56) References Cited

U.S. PATENT DOCUMENTS

| | | | | |
|---|---|---|---|---|
| 8,627,463 | B1* | 1/2014 | Glick | G06F 17/30206 |
| | | | | 707/622 |
| 2006/0095964 | A1* | 5/2006 | Costea | G06F 21/56 |
| | | | | 726/22 |
| 2009/0249482 | A1* | 10/2009 | Sarathy | G06F 21/567 |
| | | | | 726/22 |
| 2012/0023583 | A1* | 1/2012 | Sallam | G06F 21/564 |
| | | | | 726/24 |
| 2012/0159631 | A1* | 6/2012 | Niemela | G06F 21/565 |
| | | | | 726/24 |
| 2013/0145437 | A1* | 6/2013 | Zaitsev | G06F 21/56 |
| | | | | 726/4 |
| 2013/0185797 | A1* | 7/2013 | Zhou | G06F 21/52 |
| | | | | 726/23 |
| 2013/0276106 | A1* | 10/2013 | Barton | G06F 21/56 |
| | | | | 726/22 |
| 2014/0130161 | A1* | 5/2014 | Golovanov | G06F 21/564 |
| | | | | 726/23 |

OTHER PUBLICATIONS

Hongyi, Z. et al., English abstract only of Chinese application No. CN101924761A, Method for detecting malicious program according to white list, publication date Dec. 22, 2010, one page.

International Search Report regarding PCT/CN2013/088196, dated Feb. 27, 2014, 2 pages.

Gouping, L. et al., English abstract only of Chinese application No. CN102592103A, Secure file processing method, equipment and system, publication date Jul. 18, 2012, one page.

Mochen, G. et al., English abstract only of Chinese application No. CN102750463A, System and method for improving file rescanning speed, publication date Oct. 24, 2012, one page.

Aiyuan, S. et al., English abstract only of Chinese application No. CN102799811A, Scanning method and device, publication date Nov. 28, 2012, one page.

* cited by examiner

SCANNING DEVICE, CLOUD MANAGEMENT DEVICE, METHOD AND SYSTEM FOR CHECKING AND KILLING MALICIOUS PROGRAMS

FIELD OF THE INVENTION

The invention relates to the field of network information security technology, and in particular, to a scanning device, a cloud management device, a method and a system for checking and killing malicious programs.

BACKGROUND OF THE INVENTION

For most of the existing methods for checking and killing a malicious program, scanning is performed by a local engine according to a built-in scanning position, a feature such as MD5, etc. of an unknown program file which cannot be identified locally is sent to a cloud server, and the cloud server performs comparison according to the feature of the program file sent by the client and judges whether it is a malicious program, and if yes, the local engine of the client cleans up the malicious program according to a clear logic built in the client locally. However, in perfervid continued confrontation between malicious programs and security software, an author of a malicious program will always find out a new exploitable point of an operating system and a point ignored by security software, thereby bypassing the detection and checking and killing of the security software. At this point, after a security manufacturer gets a sample of a malicious program, it generally needs to modify the local engine so as to be able to check and kill a new malicious program, and during the period from getting a sample to manual analysis and then upgrading a new version of engine program file to all the clients, the malicious program has already spread over a large area.

SUMMARY OF THE INVENTION

In view of the above problems, the invention is proposed to provide a scanning device for checking and killing a malicious program and a corresponding scanning method, and a cloud management device for checking and killing a malicious program and a corresponding cloud management method, and a system and method for scanning a malicious program based on cloud security, which overcome the above problems or at least in part solve the above problems.

According to an aspect of the invention, there is provided a scanning device for checking and killing a malicious program comprising: a first transmission interface configured to transmit information to a server-side device and receive information transmitted by the server-side device; an environment information reader configured to read current system environment information of a client device and transmit it to the server-side device via the first transmission interface; a first scanner configured to obtain via the first transmission interface a first scanning content indication judged by the server-side device at least based on the system environment information, scan a specified position in the first scanning content indication, and at least transmit feature data of an unknown program file obtained by scanning to the server-side device via the first transmission interface; and a second scanner configured to obtain via the first transmission interface a second scanning content indication transmitted by the server-side device, the second scanning content indication comprising scanning a specified attribute of the unknown program file and/or a specified attribute of the contextual environment of the unknown program file, and scan according to the second scanning content indication.

According to another aspect of the invention, there is provided a cloud management device for checking and killing a malicious program comprising: a second transmission interface configured to transmit information to a client device and receive information transmitted by the client device; a first indicator configured to generate a first scanning content indication according to characteristics of a newborn malicious program and system environment information transmitted by the client device, the first scanning content indication at least comprising scanning content at a specified position and notifying scanned feature data of an unknown program file, and transmit the first scanning content indication to the client device via the second transmission interface; a first matcher configured to obtain via the second transmission interface feature data of the unknown program file transmitted by the client device, and hereby perform matching in known records of feature data of malicious programs; and a second indicator configured to generate a second scanning content indication when the first matcher fails to match to a known record, the second scanning content indication comprising scanning a specified attribute of the unknown program file and/or a specified attribute of the contextual environment of the unknown program file, and transmit the same to the client device via the second transmission interface.

According to a further aspect of the invention, there is provided a system for scanning a malicious program based on cloud security comprising any one scanning device for checking and killing a malicious program as above and any one cloud management device for checking and killing a malicious program as above.

According to a yet further aspect of the invention, there is provided a cloud management method for checking and killing a malicious program comprising: generating a first scanning content indication according to characteristics of a newborn malicious program and system environment information transmitted by a client device, the first scanning content indication at least comprising scanning content at a specified position and notifying scanned feature data of an unknown program file, and transmitting the first scanning content indication to the client device; obtaining feature data of the unknown program file transmitted by the client device, and hereby performing matching in a known database for checking and killing malicious programs; and generating a second scanning content indication when a known record fails to be matched to the feature data of the unknown program file, the second scanning content indication comprising scanning a specified attribute of the unknown program file and/or a specified attribute of the contextual environment of the unknown program file, and transmitting the second scanning content indication to the client device.

According to a still further aspect of the invention, there is provided a method for scanning a malicious program based on cloud security comprising: a client device reading current system environment information and transmitting it to a server-side device; the server-side device generating a first scanning content indication according to characteristics of a newborn malicious program and the system environment information transmitted by the client device, the first scanning content indication at least comprising scanning content at a specified position and notifying scanned feature data of an unknown program file, and transmitting the first scanning content indication to the client device; the client device scanning according to the first scanning content indication, and at least transmitting feature data of the unknown program file obtained by scanning to the server-side device; the server-side device performing matching in a known database for checking and killing malicious programs according to the feature data of the unknown program file; the server-side device generating a second scanning content indication when a known record fails to be matched to the feature data of the unknown program file, the second scanning content indication comprising scanning a specified attribute of the unknown program file and/or a specified attribute of the contextual environment of the unknown program file, and transmitting the second scanning content indication to the client device; and the client device scanning according to the second scanning content indication.

It can be seen from embodiments provided by the invention that when it can not be judged whether an unknown program file is a malicious program or it is impossible to find an accurate fixing scheme only by basic feature data (e.g., file name, MD5, SHA1 or other feature computed according to file content, etc.) of the unknown program file, it may further be judged by requiring the client device to further scan a specified attribute such as the signature, version, etc. of the unknown program file and/or an attribute of the contextual environment of the unknown program file, such that the unknown program file which the client itself cannot determine to be secure can be judged more accurately. Due to employing such a scheme, the cloud server timely issues personalized scanning content, and obtains a checking and killing method from the server-side according to an attribute of a program file and an attribute of the contextual environment where it is located, avoiding that a newborn malicious program can only be detected and removed by upgrading a local feature library and an engine program, and thereby quickening the striking speed for a newborn malicious program, and effectively curbing its rapid spread.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following exemplary embodiments of the disclosure will be described in more detail with reference to the accompanying drawings. While the exemplary embodiments of the disclosure are shown in the drawings, it will be appreciated that the disclosure may be implemented in various forms and should not be limited by the embodiments set forth herein. Rather, these embodiments are provided in order for one to be able to more thoroughly understand the disclosure and in order to be able to fully convey the scope of the disclosure to those skilled in the art.

Embodiments of the invention may be applied in a computer system/server, which may be operated together with a multitude of other general- or special-purpose computing system environments or configurations. Examples of well known computing systems, environments and/or configurations suitable for use with a computer system/server comprise, but not limited to, a personal computer system, a server computer system, a thin client, a thick client, a hand held or laptop device, a microprocessor-based system, a set-top box, a programmable consumer electronic product, a network personal computer, a small computer system, a large computer system and a distributed cloud computing environment comprising the any above system, etc.

A computer system/server may be described in the general context of a computer system executable instruction (such as a program module) executed by a computer system. In general, the program module may comprise a routine, a program, target program, component, logic, data structure, etc., which performs a specific task or implements a specific abstract data type. The computer system/server may be embodied in a distributed cloud computing environment, and in the distributed cloud computing environment, a task is performed by remote processing devices linked by a communication network. In the distributed cloud computing environment, the program module may be located on a local or remote computing system storage medium comprising a storage device.

Figure 1:
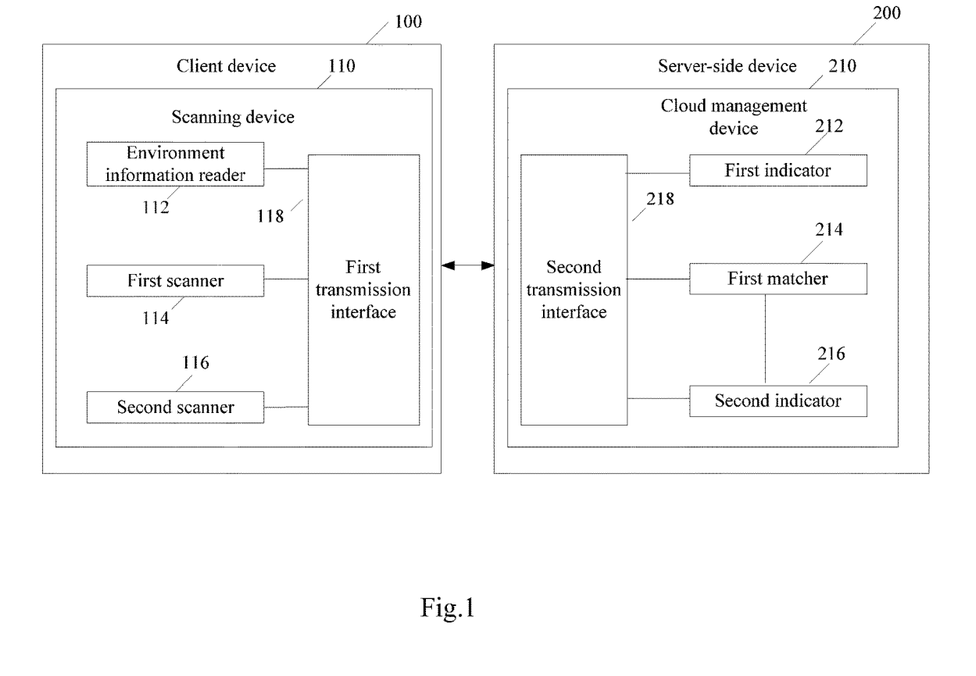
FIG. 1 shows a system for scanning a malicious program based on cloud security according to an embodiment of the invention.

Reference is made to FIG. 1, which shows a system for scanning a malicious program based on cloud security according to an embodiment of the invention comprising a scanning device 110 for checking and killing a malicious program and a cloud management device 210 for checking and killing a malicious program, wherein the scanning device 110 may be arranged in a client, e.g., a client device 100, and the cloud management device 210 may be arranged at a server side, e.g., in a server-side device 200. The scanning device 110 may be in communication with the cloud management device 210. In particular, a first transmission interface 118 in the scanning device 110 may transmit information to the server-side device 200, and receive information transmitted by the server-side device 200; and a second transmission interface 218 of the cloud management device may transmit information to the client device, and receive information transmitted by the client device 100. Therein, the scanning device 110 may comprise an environment information reader 112, a first scanner 114, a second scanner 116 and the first transmission interface 118. The cloud management device 210 may comprise a first indicator 212, a first matcher 214, a second indicator 216 and the second transmission interface 218.

First, the environment information reader 112 reads current system environment information of the client device 100, and transmits it via the first transmission interface 118 to the second transmission interface 218 of the server-side device 200. The current system environment information of the client device 100 may comprise much information, for example, one or more of the version information of an operating system, system patch installation information, software installation information, driver installation information, active process and service information, etc. Therein, there are multiple kinds of operating systems, for example, windows 98, windows 2003, windows XP and Windows Vista, etc., the version information corresponding to a different operating system is also different, and therefore, by the version information of the operating system, the server-side device 200 may know which specific version of operating system is currently run on the client device 100. The active process is namely a process running in the system, and various information on a currently running process and the identifier, user name, cpu occupancy rate, memory occupancy rate, description information, etc. related to the process may be queried in the system by multiple means, such as invoking a corresponding API (Application Programming Interface) function, and the like. After the client device 100 initializes the local engine and the network environment, the environment information reader 112 may read the current system environment information and transmit it to the server-side device 200.

After the second transmission interface 218 in the cloud management device 210 located in the server-side device 200 receives the current system environment information of the client device 100, the information is transmitted to the first indicator 212, and in turn the first indicator 212 generates a first scanning content indication according to characteristics of a newborn malicious program and the system environment information transmitted by the client device 100. Therein, there may be multiple kinds of characteristics of a newborn malicious program, such as feature information in which a newborn malicious program utilizes a specific position to hide and/or attack and which is analyzed out according to the popularization trend of newest malicious programs, for example, a position usually utilized by a newborn malicious program, e.g., the installation directory of a certain game, the installation directory of commonly used software, some specific registry entries, etc. In turn, the server-side device 200 may give a scanning content indication personalized with respect to the client device, i.e. the first scanning content indication, according to a hidden and/or attacked position usually utilized by a newborn malicious program in combination with the current system environment information reported by the client device. For example, it is found from the software installation information reported by the client device 100 that a certain piece of game software has been installed on the client device 100, whereas it is known from the characteristics of a newborn malicious program that currently many malicious programs utilize the installation directory of the game software to hide or maliciously replace a file, and then the server-side device 200 will require the client device 100 in the first scanning content indication to scan content under the game installation directory, in order to find a suspicious unknown program file in the client device 100. It may be seen that, since the first scanning content indication is not only based on the characteristics of a newborn malicious program learned by the server side, but also combined with the particular system environment information of the client device 100, the first scanning content indication is personalized and targeted, and the first scanning content indication issued with respect to a different client device 100 is often different.

In the first scanning content indication, there is at least comprised scanning content at a specified position and requiring notification of scanned feature data of the unknown program file. In particular, the first scanning content indication may be a piece of text or script generated according to the characteristics of a newborn malicious program and the current system environment information of the client device 100, that is, from the indication, it can be notified to the client device 100 which content needs to be scanned and which scanning results need to be reported.

It should be noted that, the first scanning content indication may be an indication without any condition attached, or also may be an indication with a condition attached. If it is an indication with a condition attached, then only when the preset condition is met, the scanning device 110 in the client device 100 will scan according to the first scanning content indication. There may be many conditions which are attached to the first scanning indication, for example, comprising but not limited to one or more of the following: whether a specified file exists, whether a specified directory exists, whether an attribute of a program file meets a specified condition (for example, whether the message digest MD5 is a specified value), whether a specified registry key exists, whether a specified registry key value exists, whether content of a registry key meets a specified condition, whether content of a registry key value meets a specified condition (for example, whether it contains or equals a certain character string or a certain value), whether a specified process exists, whether a specified service exists, and whether a specified service meets a specified condition (for example, whether it is a certain service name, a certain service description or a certain display name), or the like.

After the first scanner 212 generates the first scanning content indication, the server side transmits the first scanning content indication via the second transmission interface 218 to the first transmission interface 118 in the client device 100.

Then, the first transmission interface 118 located in the scanning device 110 in the client device 100 notifies the scanner 114 of the received first scanning content indication obtained by the server-side device 200 by judgment at least based on the system environment information. In turn, the first scanner 114 scans a specified position in the first scanning content indication. It is mentioned previously that the first scanning content indication may be an indication with a condition attached, or called a scanning condition, and then the first scanner 114 needs to first judge whether the scanning condition attached to the first scanning content indication is met, for example, those previously mentioned optional conditions. Only when the first scanner 114 judges that the condition attached to the first scanning content is met, the specified position in the first scanning content indication is scanned. Of course, if the first scanning content indication is not an indication with a condition attached, then the first scanner 114 does not need to first perform the judgment, and scans directly according to the scanning position indicated in the first scanning content.

Optionally, besides that the first scanner 114 performs a personalized scanning in the client device 100 according to the first scanning content indication, the first scanner 114 may further perform a regular scanning on a scanning position built in a local engine of the client device 100.

An unknown program file will be found after the first scanner 114 finishes scanning, and then feature data of the unknown program file is extracted. There are many kinds of the feature data, for example, one or more of the following: the data computed for all or part of the key content of the unknown program file (i.e., a part of the content extracted from the file) according to a specific algorithm (e.g., MD5, SHA1 or other algorithm), and the file name etc. Such feature data of a program file may be understood as the basic attribute information of the program file. After obtaining the feature data of the unknown program file, the first scanner 114 transmits the feature data of the unknown program file via the first transmission interface 118 to the second transmission interface 218 in the server-side device 200.

In turn, the second transmission interface 218 at the server side provides the received feature data of the unknown program file to the first matcher 214, and the first matcher 214 hereby performs matching in a known database for checking and killing malicious programs. In this database, there is recorded some feature information of malicious programs, and in addition there may be recorded a judgment logic which judges whether a program is a malicious program, and a possible checking and killing method (e.g., a fixing logic), etc. Therein, a feature of a malicious program may comprise much information, for example, attribute information of a file such as file name, digest of the program file, file size, signature information, version information, etc., for another example, it may further comprise an attribute of the contextual environment of a program file such as a directory where the file is located, a startup position in a registry, an attribute of other file under the same directory or a specified directory, etc. Since an existing malicious program is relatively complex, it generally cannot be accurately judged whether a program is a malicious program purely by one or two feature, and in many cases a comprehensive judgment needs to be done according to multiple features. Such a logic which comprehensively judges whether an unknown program file is a malicious program is the previously mentioned judgment logic. The checking and killing method comprises but not limited to scanning/determination and fixing operations. Since the storage capacity, computation capacity, the capacity of collecting feature information of malicious programs and the updating speed of the server side are far stronger than that of the client, when the client device 100 cannot judge an unknown program file according to the local engine, the server-side device 200 may judge according to the known database.

If the first matcher 214 matches successfully in the known database for checking and killing malicious programs, namely, can judge whether the unknown program file is a malicious program, and optionally, may further match to a corresponding fixing logic in some cases, then the judgment result and the corresponding fixing logic may be fed back to the first transmission interface 118 of the client device 100 via the second transmission interface 218. Optionally, the client device 100 further comprises a remover, the first transmission interface 118 in the client device 100 notifies the remover of the fixing logic and the judgment result in which the server-side device 200 judges out whether the unknown program file is a malicious program based on its feature, and the remover performs a corresponding operation. For example, if in the judgment result it is found that the unknown program file is a malicious program, then the remover performs fixing processing for the unknown program file according to the fixing logic returned by the server-side device 200. The fixing processing comprises but not limited to deleting a specified registry key/value, modifying a specified registry key/value as specified content, deleting a specified system service item, fixing/deleting a specified program file, and so on.

In particular, with respect to fixing a specified program file, there are multiple fixing schemes according to different types of files needing to be fixed. For example, some are system files that need to be fixed, some are program files of commonly used software, and some are general files. The basic principles for fixing these program files are similar, and are generally that the server side performs matching in a cloud database according to some attribute information of a program file that needs to be fixed at the client, finds out whether there is a matched program file which is not infected with a virus, and if yes, provides it to the client for replacement, thereby accomplishing the fixing. For a different file, when in particular matching, a different matching condition may be set according to actual needs. For example, if it is a system file, it may be required that the matching is successful only if all the various attribute information (e.g., file name, version information, etc.) of the file is consistent, that is, a replacement file for fixing is found successfully; whereas for a general non-system file, if its basic version or standard version is stored in the cloud database, then the matching may also be considered successful. In addition, even if it is equally a system or equally a general non-system file, a different matching condition may also be set according to a different actual application environment, a different requirement of the file, or a different operating system. For example, it may be that for a certain kind of system file, it is needed that all the various attributes such as the file name, version information, etc. are consistent, such that the matching is considered successful, but for another kind of system file, it is only needed that the file name is consistent and the version is the basic version or standard version, such that the matching may be considered successful.

Further, in the following, that a kind of commonly used software is damaged by a Trojan is taken as an example to describe in detail how to replace a program file in the fixing procedure. For example, after the Trojan has damaged a program file of certain commonly used software, the information of the original program file is already unavailable. In such a case, the server-side device 200 may know from the information on the software, e.g., the name and version of the software, the version and directory of the program file, etc., provided previously by the client device 100, that which replacement files need to be provided for the client device 100, in turn perform matching in the cloud database according to the name and version, etc. of the file, find out a replacement file which is not infected with a virus and matched to provide it to the client device 100, and then the client device 100 replaces the original damaged program file with the program file provided by the server-side device 200 which is not infected with a virus and is consistent with the native machine.

If the first matcher 214 fails to match successfully in the known database for checking and killing malicious programs, namely, fails to match accurately according to the feature data of the unknown program file, then it will notify the second indicator 216, and in turn, the second indicator 216 continues to generate a second scanning content indication according to basic information provided by the feature data of the unknown program file and known characteristics of the newborn malicious program. Since from the first indicator, basic attribute information such as the feature data of the unknown program file, etc. is already known, then characteristics of the current malicious program are combined, for example, what features such an unknown program file generally further has if it is a malicious program, e.g., the signature information of the unknown program file may not be a specified name, an attribute of other file under the directory where the unknown program file is located or a related directory may be a specified attribute, and so on.

In particular, the second scanning content indication comprises scanning a specified attribute of the unknown program file and/or a specified attribute of the contextual environment of the unknown program file. For example, the second scanning content indication may only require the client device 100 to scan a specified attribute of the unknown program file and report it, or also may only require the client device 100 to scan a specified attribute of the contextual environment of the unknown program file and report it, or also may require the client device 100 to report other specified attribute and a specified attribute of the contextual environment together.

It should be noted that a specified attribute of the unknown program file comprises but not limited to one or more of the following: feature data, file size, security level, signature information and version information, etc. It should be noted that although the client device 100 has already reported the basic attribute, i.e., the feature data of the unknown program file after scanning previously according to the first scanning content indication of the server side, since there may not be a long connection between the client device 100 and the server-side device 200, subsequently, the client device 100 may further need to report the basic information such as the feature data, etc. of the unknown program file once again when reporting specified attribute information of the unknown program file after scanning according to the second scanning content indication of the server side. Therefore, in the second scanning content indication, there may be both the content requiring scanning and reporting other specified attribute than the feature data of the unknown program file and the content requiring scanning and reporting the feature data of the unknown program file. Of course, if there is a long connection between the client device 100 and the server-side device 200, it may not be required in the second scanning content indication that the client device 100 reports once again the basic information such as the feature data, etc. of the unknown program file which was reported ever. The security level comprises but not limited to malicious (i.e., belonging to a black list), secure (i.e., belonging to a white list and credible), unknown and suspicious, etc. An attribute of the contextual environment of the unknown program file comprises but not limited to one or more of the following: information on a directory where the unknown program file is located, information on a registry key value, attribute information of other file under the same directory as the program file or a specified directory, and the running state of a specified process, and so on.

After generating the second scanning content indication, the second indicator 216 transmits it to the first transmission interface 118 in the client device 100 via the second transmission interface 218, and in turn the first transmission interface 118 notifies the second scanner 116 of the second scanning content indication. The second scanner 116 scans again specified attribute information of the unknown program file and/or attribute information of the contextual environment according to the second scanning content indication, and finally transmits the scanning result to the second transmission interface 218 of the server-side device 200.

In an embodiment of the invention, the second transmission interface 218 notifies again the second indicator 216 of the received scanning result provided by the second scanner 116, and in turn the second indicator 216 hereby performs an analysis and comparison in the known database for checking and killing malicious programs. In the foregoing, the particular content of the database for checking and killing malicious programs has been given. From this, since this time the scanning result of the unknown program file provided by the client device 100 contains more information, for example, contains other attribute such as the signature information, security level, version information, etc. of the unknown program file, or contains various attribute information of the contextual environment of the unknown program file, or again, both other attribute of the unknown program file and an attribute of the contextual environment are scanned, the second indicator 216 may further analyze and judge whether the unknown program file is a malicious program file according to the more comprehensive information, the feature information in the database for checking and killing malicious programs and the judgment logic, and if it is judged to be a malicious program, it may further examine whether there is a corresponding fixing logic. The fixing logic comprises but not limited to one or more of the following logics: deleting a specified registry key and/or key value, modifying a registry key and/or key value as specified content, deleting a specified system service item, and fixing/deleting a specified program file.

In turn, the second indicator 216 transmits the judgment result of whether the unknown program file is a malicious program file to the client device 100 via the second transmission interface 218. Further, if the judgment result is a malicious program, and a matched fixing logic can be found in the known database for checking and killing malicious programs, then the matched fixing logic is also transmitted to the client device via the second transmission interface 218.

The scanning device 110 of the client further comprises a first processor, and the first processor obtains via the first transmission interface 118 the judgment result of whether the unknown program file is a malicious program file provided by the second indicator in the server-side device 200, and performs a corresponding processing according to the judgment result. For example, if the judgment result is a secure program file, then it is unnecessary to perform a checking and killing processing on the unknown program file; if the judgment result is a malicious program, and the second indicator 216 provides a fixing logic, then the user may be prompted and asked whether to perform fixing, and after getting a confirmation from the user, the unknown program file is fixed according to the fixing logic.

In another embodiment of the invention, to reduce communication between the client device 100 and the server-side device 200, the second indicator 216 may further send a judgment logic related to the second scanning content indication, and even a fixing logic related to the judgment logic together to the client device 100 at the same time when notifying the client device 100 of the second scanning content indication. In particular, since the second scanning content indication mainly comprises scanning other specified attribute than the feature data of the unknown program file and/or a specified attribute of the contextual environment of the unknown program file, the server side may foresee which scanning results may be obtained after the client device 100 scans according to the second scanning content indication, then may judge what scanning result shows that the unknown program file is a malicious program according to the database for checking and killing malicious programs, and therefore, may search out a judgment logic related to the second scanning content indication, namely, how to judge whether the unknown program file is a malicious program according to a subsequent scanning result. If it is a malicious program, it may be further found whether there is a fixing logic related to the above second scanning content indication and the judgment logic according to the known database for checking and killing malicious programs.

The scanning device 110 located in the client may further comprise a second processor, and the second processor obtains via the first transmission interface 118 the judgment logic related to the second scanning content indication provided by the second indicator 216 at the server side, then judges whether the unknown program file is a malicious program and performs a corresponding processing according to the judgment logic and the scanning result obtained after the second scanner 116 scans according to the second scanning content indication. For example, if the judgment result is that the unknown program file is a malicious program, and the second indicator 216 at the server side also sends a fixing logic related to the judgment logic, then a corresponding fixing processing may be done according to the fixing logic when the scanning result provided by the second scanner 116 meets the fixing logic. The particular content of the rest processing is similar to the corresponding processing done by the first processor in the previous embodiment, and will not be repeated. It may be seen that in this embodiment, the second scanner 116 does not need to upload to the server-side device the result after scanning the unknown program file according to the second scanning content indication any more, but directly provides it to the second processor.

It can be seen from the above embodiments that if the scanning device 110 only comprises the environment information reader 112, the first scanner 114, the second scanner 116 and the first transmission interface 118, then it is purely a device for scanning a malicious program, and if it further comprises a first processor or a second processor, then the scanning device is essentially a device capable of accomplishing checking and killing a malicious program, and may be understood as a device for checking and killing a malicious program.

Figure 2:
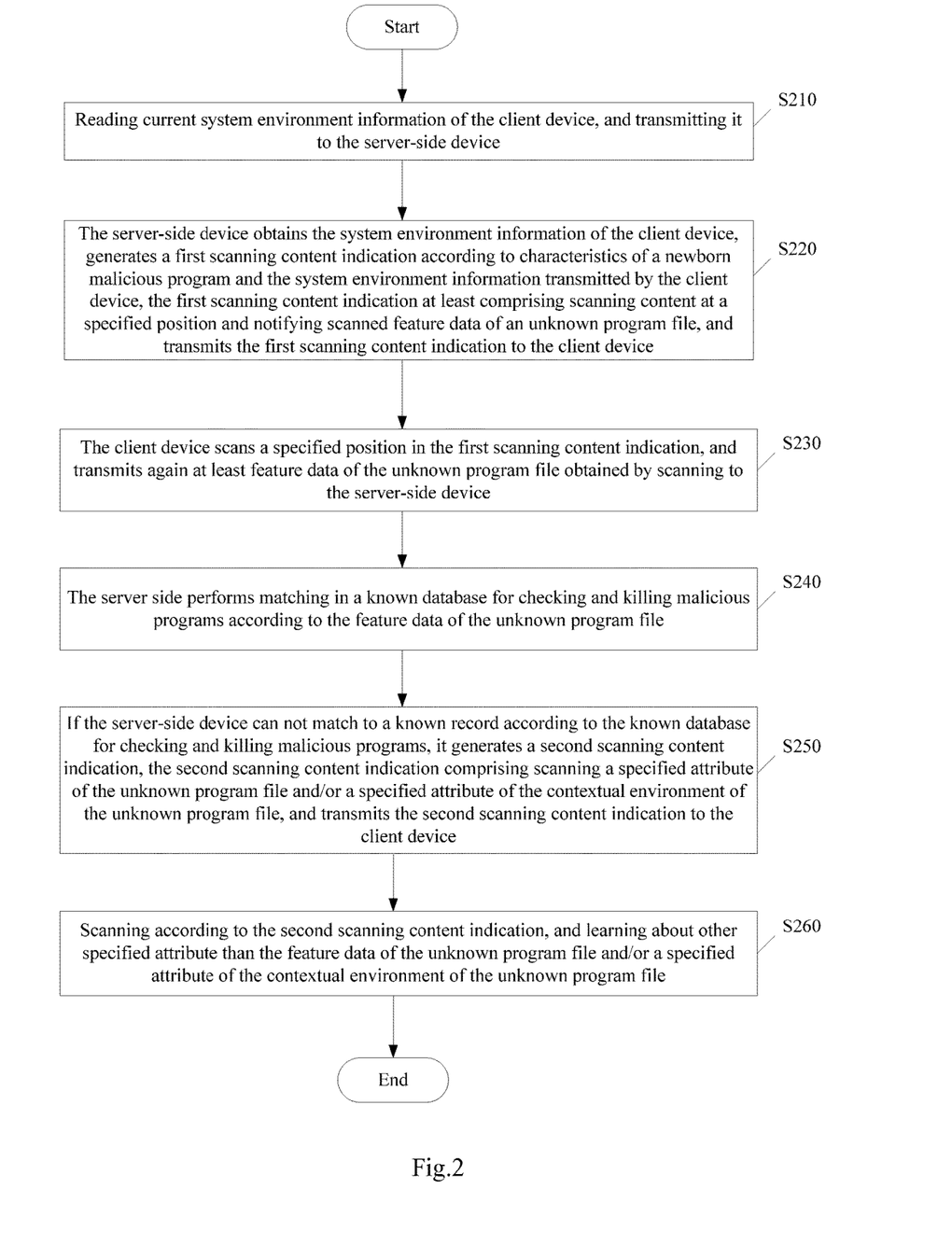
FIG. 2 shows a flow chart of a method for scanning a malicious program based on cloud security according to an embodiment of the invention.

Reference is made to FIG. 2, which shows a flow chart of a method for scanning a malicious program based on cloud security according to an embodiment of the invention. The method comprises one part of flow located at the client side, and further comprises one part of flow located at the server side, the flow at the client side is a scanning method for checking and killing a malicious program, and the flow at the server side is a cloud management method for checking and killing a malicious program.

The method begins in step S210. In S210, current system environment information of the client device is read, and transmitted to the server-side device. The system environment information comprises but not limited to any one or more of the version information of an operating system, system patch installation information, software installation information, driver installation information, active process and service information, etc. This step may be implemented by the environment information reader 112 in the above scanning device 110, and the relevant technical implementation may be referred to the relevant description of the above mentioned environment information reader 112 in the individual embodiments and will not be repeated here.

Then, in step S220, the server-side device obtains the system environment information of the client device, generates a first scanning content indication according to characteristics of a newborn malicious program and the system environment information transmitted by the client device, the first scanning content indication at least comprising scanning content at a specified position and notifying scanned feature data of an unknown program file, and transmits the first scanning content indication to the client device. This step may be implemented by the above first indicator 212 located in the cloud management device 210 at the server side, and the relevant technical implementation is also referred to the relevant description of the first indicator 212 in the above individual embodiments and will not be repeated here.

After the client device obtains the first scanning content indication judged by the server-side device based on the system environment information uploaded by it in step S220, in step S230, it scans a specified position in the first scanning content indication, and transmits again at least feature data of the unknown program file obtained by scanning to the server-side device, such that the server-side device performs a further judgment hereby. This step may be implemented by the first scanner 114 located in the scanning device 110 at the client, and the relevant technical implementation is also referred to the relevant description of the first scanner 114 in the above individual embodiments and will not be repeated here.

After obtaining the feature data of the unknown program file transmitted by the client device in step S230, in step S240, the server-side device performs matching in a known database for checking and killing malicious programs according to the feature data of the unknown program file, and judges whether the unknown program file is a malicious program. If the matching is successful, and it is judged that the unknown program file is a malicious program, it may further find out whether there is a corresponding fixing logic, and if yes, the judgment result and the fixing logic may be transmitted together to the client; and if a corresponding fixing logic is not found, then it is possible to transmit only the judgment result to the client device. This step may be implemented by the above mentioned first matcher 214 located in the cloud management device 210 at the server side, and the relevant technical implementation is also referred to the relevant description of the first matcher 214 in the above individual embodiments and will not be repeated here.

If the server-side device cannot match to a known record according to the known database for checking and killing malicious programs, namely, cannot judge whether the unknown program file is a malicious program, in step S250, it generates a second scanning content indication, the second scanning content indication comprising scanning a specified attribute of the unknown program file and/or a specified attribute of the contextual environment of the unknown program file, and then transmits the second scanning content indication to the client device. It can be seen that the reason why the server-side device further sends the second scanning content indication to the client device is to obtain more information related to the unknown program file so as to perform a further judgment. This step may be implemented by the above mentioned second indicator 216 located in the cloud management device 210 at the server side, and the relevant technical implementation is also referred to the relevant description of the second indicator 216 in the above individual embodiments and will not be repeated here.

After obtaining the second scanning content indication through step S250, in step S260, the client device scans according to the second scanning content indication, thereby learning about a specified attribute of the unknown program file and/or a specified attribute of the contextual environment of the unknown program file. For example, a specified attribute of the unknown program file comprises but not limited to one or more of the following: feature data, file size, security level, signature information and version information, etc. of the unknown program file. For another example, a specified attribute of the contextual environment of the unknown program file comprises but not limited to one or more of the following: information on a directory where the unknown program file is located, information on a startup position in a registry, attribute information of other file under the same directory as the program file or a specified directory, and the running state of a specified process, and so on.

After step S260, in an embodiment of the invention, first the client device transmits the scanning result after scanning according to the second scanning content indication to the server-side device, this step may be implemented by the second scanner 116 in the above individual embodiments, and the relevant technical features may be referred to the description of this component and will not be repeated here; and in turn, after obtaining the scanning result obtained by the client device by scanning according to the second scanning content indication, the server-side device performs a further analysis and comparison in the known database for checking and killing malicious programs according to the scanning result, judges again whether the unknown program file is a malicious program, and then transmits the judgment result (e.g., malicious, secure, unknown, suspicious) and/or a fixing logic matching the scanning result to the client device. The server-side device may perform this step by the second indicator 216 in the cloud management device 210 in the above individual embodiments, and the relevant technical features may be referred to the description of this component and will not be repeated here. It should be noted that, it is not in all the cases where the program file is judged to be a malicious program that a corresponding fixing logic can be found, and therefore in a case where the logic is found, the judgment result and the fixing logic may be transmitted together to the client device; in a case where a fixing logic is not found, only the judgment result may be transmitted to the client for its or the user's reference; it is also possible to only transmit the fixing logic, since the client may understand that the unknown program file is a malicious program upon receiving the fixing logic, otherwise, the server-side device will not feed a fixing logic with respect to the unknown program file back to it. After obtaining the judgment result of whether the unknown program file is a malicious program fed back by the server-side device, the client device may perform a corresponding processing according to the judgment result. For example, the user is prompted by security reminder means such as a popup window, etc., or a fixing processing is done according to the fixing logic after the confirmation by the user. The client device may perform this step by the first processor in the scanning device 110 in the above individual embodiments, and the relevant technical features may be referred to the description of this component and will not be repeated here.

It can be seen from the description of the subsequent steps in this embodiment that the client device needs to transmit the scanning result to the server-side device at least twice, in order for the server-side device to judge according to the scanning result. To reduce the number of communications between the client device and the server-side device and improve the efficiency, the following flow may be employed for processing in yet another embodiment of the invention.

In yet another embodiment of the invention, in the above step S250, besides generating a second scanning content indication and sending it to the client device, the server-side device further obtains a judgment logic and/or a fixing logic related to the second scanning content indication according to the known database for checking and killing malicious programs, and then transmits the judgment logic and/or the fixing logic and the second scanning content indication together to the client device. This step may be implemented by the second indicator 216 in the cloud management device 210 in the above individual embodiments, and the relevant technical implementation may be referred to the relevant description of this component and will not be repeated here. It can be seen that after step S250, the client device has already received at least the second scanning content indication and a judgment logic related to the second scanning content indication, and it is further possible for it to have also received a fixing logic related to the second scanning content indication together. Therefore, after the client device obtains the scanning result by scanning according to the second scanning content indication by step S260, the client device may judge whether the unknown program file is a malicious program according to the judgment logic related to the second scanning content indication transmitted by the server-side device and the scanning result, and if yes, further detect whether the server-side device transmits a related fixing logic simultaneously, and if yes, continue to perform a fixing processing for the unknown program file according to the fixing logic, for example, deleting a specified registry key and/or key value, modifying a specified registry key and/or key value as specified content, deleting a specified system service item, fixing/deleting a specified program file, and so on. This step may be implemented by the second processor in the scanning device 110 in the above individual embodiments, and the relevant technical implementation may be referred to the relevant description of this component and will not be repeated here.

Figure 3:
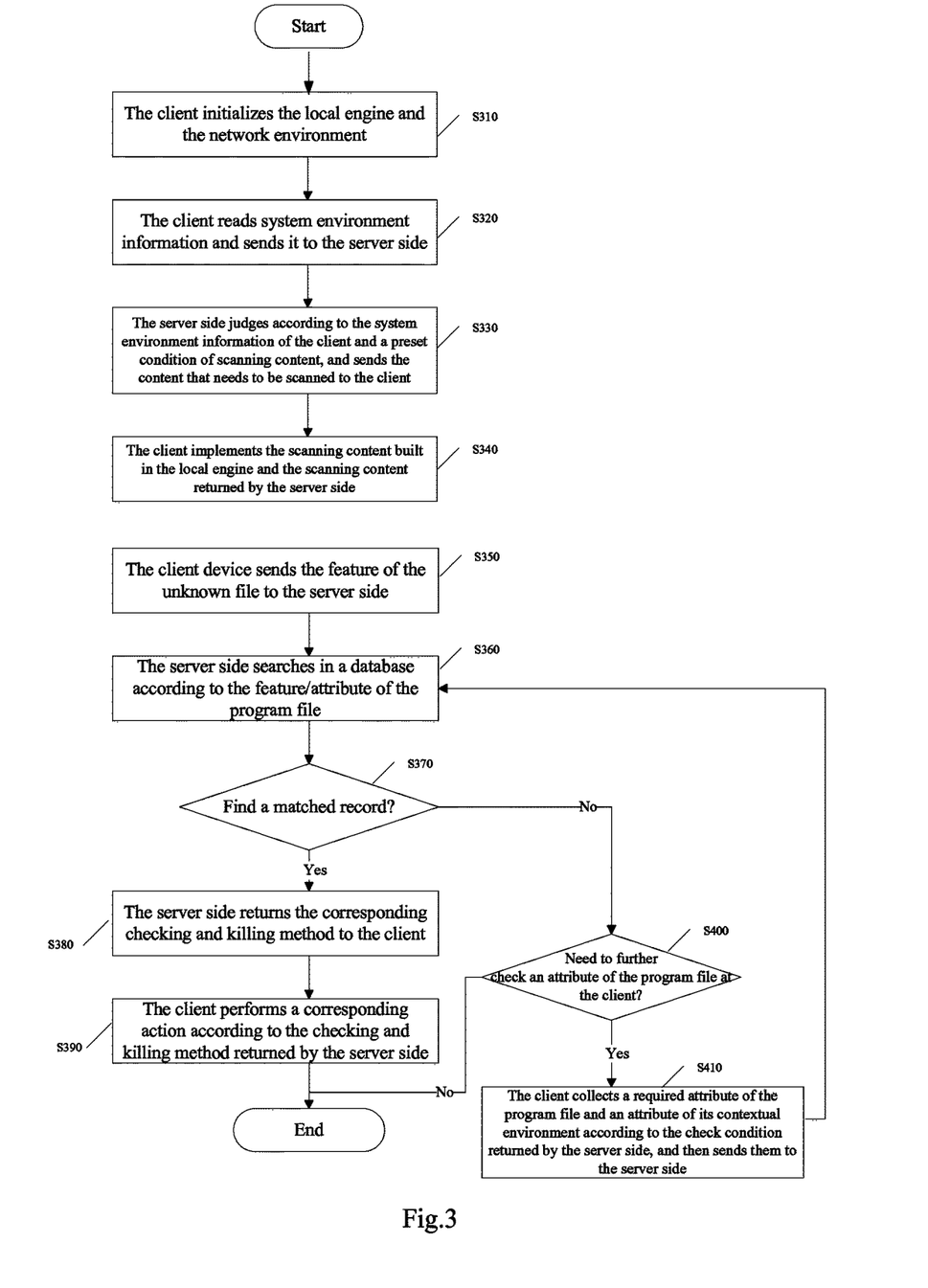
FIG. 3 shows a flow chart of a method for checking and killing a malicious program based on cloud security according to a further embodiment of the invention.

In still another embodiment of the invention, a method for checking and killing a malicious program based on cloud security is presented, and reference is made to a flow chart as shown in FIG. 3.

The flow begins in step S310, in which the client initializes the local engine and the network environment.

Then, step S320 is performed, in which the client reads system environment information and sends it to the server side.

In turn, step S330 is performed, in which the server side judges according to the system environment information of the client and a preset condition of scanning content, and sends the content that needs to be scanned to the client. The content that needs to be scanned here is equivalent to the first scanning content indication in the foregoing individual embodiments.

Then, step S340 is performed, in which the client implements the scanning content built in the local engine and the scanning content returned by the server side, and obtains a feature such as file name, MD5 or SHA, etc. of an unknown program file.

Then, step S350 is performed, in which the client device sends the feature of the unknown program file to the server side.

Afterwards, step S360 is performed, in which the server side searches in a database according to the feature of the program file and/or an attribute of the contextual environment of the program file.

Then, the flow proceeds to step S370, in which it is judged whether a matched record is found in the database, namely, whether a corresponding checking and killing method is found, comprising but not limited to a scanning/determination action and a fixing action. If a matched record is found, step S380 is performed; and if a matched record is not found, step S400 is performed.

In step S380, the server side returns the corresponding checking and killing method to the client, and then step S390 is performed.

In step S390, the client performs a corresponding action according to the checking and killing method returned by the server side. Then, the flow ends.

In step S400, the server side judges whether it needs to further check other attribute of the unknown program file, for example, other attribute than the feature of the unknown program file fed back by step S350, and/or an attribute of the contextual environment of the unknown program file, etc. If yes, the flow continues to perform step S410; and if no, the flow ends directly.

In step S410, the client collects a required specified attribute of the program file and an attribute of its contextual environment according to the check condition returned by the server side, and then sends them to the server side. Then, the flow goes back to perform step S360, until the flow ends.

In yet a further embodiment of the invention, a specific example of checking and killing a malicious program is presented.

For example, certain A/V software xxxUpdate.exe will load xxxUpdate.dll under the same directory. The A/V software is a piece of software with a very large amount of installation in China, but no sufficient protection and tamper-proof check is done for its own program files, and therefore a malicious program m may utilize this security vulnerability of the A/V software to replace xxxUpdate.dll with a malicious program. The detection and checking and killing step employing this scheme is as follows.

First, the client sends the file name and MD5 value of xxxUpdate.dll to the server side.

Then, the server side matches out a corresponding checking and killing method according to the file name and MD5 value, and then further sends out a scanning indication (equivalent to the second scanning content indication in the above individual embodiments), a judgment logic and a fixing logic to the client. Therein, in the scanning indication it is required to check whether the security level of the file is credible, whether the company signature name of the file is "Beijing xxx Ltd."; in the judgment logic it is indicated that if the security level of the file is not credible and the company signature name of the file is not "Beijing xxx Ltd.", the file is judged to have been tampered by a malicious program and is a malicious program; and in the corresponding fixing logic it is pointed out that if the scanning result meets the judgment logic, the file is judged to be a malicious program, the corresponding fixing action is to forbid xxx-Update.exe to be started along with the system, and replace xxxUpdate.dll with the original file.

Finally, the client scans the file according to the above scanning content, and judges whether the file is a malicious program according to the scanning result and the judgment logic provided by the server side, and if yes, reports the malicious program to the user, and performs a checking and killing action, e.g., fixing processing, returned by the server side when the user chooses to clear.

In another embodiment of the invention, the client device does not report the current system environment information to the server-side device, and in turn, the server side also does not need to generate the first scanning content indication according to the system environment information reported by the client device, and then let the client device scan according to the first scanning content indication. Instead, the client device scans directly according to a known scanning logic (e.g., a scanning logic of the local engine or a scanning logic notified by the server side previously), and then directly reports a suspicious unknown program file which cannot be judged to be secure or not obtained by scanning to the server-side device, the rest processing procedures are the same as described in the above individual embodiments, and therefore will not be repeated.

It can be seen from the above individual embodiments provided by the invention that, in the embodiments of the invention, when it cannot be judged whether an unknown program file is a malicious program or it is impossible to find an accurate fixing scheme only by the file name, MD5, SHA, etc. of the suspicious unknown program file, it may further be judged by requiring the client device to further scan other attribute such as the signature, version, etc. of the unknown program file and/or an attribute of the contextual environment of the unknown program file, such that the unknown program file which the client itself cannot determine to be secure can be judged more accurately. Due to employing such a scheme, whether the client sends further scanned various attribute results to the server side for judgment, or the server side directly sends a judgment logic, a fixing logic related to the scanning result together to the client for judgment by itself, essentially, the cloud server timely issues personalized scanning content, and obtains a checking and killing method from the server-side according to an attribute of a program file and an attribute of the contextual environment where it is located, avoiding that a newborn malicious program can only be detected and removed by upgrading a local feature library and an engine program, and thereby quickening the striking speed for a newborn malicious program, and effectively curbing its rapid spread.

The algorithms and displays provided here are not inherently related to any specific computer, virtual system or other apparatus. Various general-purpose systems may also be used with the teachings herein. According to the above description, the structure required for constructing such systems is obvious. In addition, the invention is not directed to any specific programming language. It should be understood that the content of the invention described herein may be carried out utilizing various programming languages, and that the above description for a specific language is for the sake of disclosing preferred embodiments of the invention.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the invention and forming a different embodiment. For example, in the following claims, any one of the claimed embodiments may be used in any combination.

Embodiments of the individual components of the invention may be implemented in hardware, or in a software module running on one or more processors, or in a combination thereof. It will be appreciated by those skilled in the art that, in practice, some or all of the functions of some or all of the components in a scanning device or a cloud management device for checking and killing a malicious program according to individual embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 4:
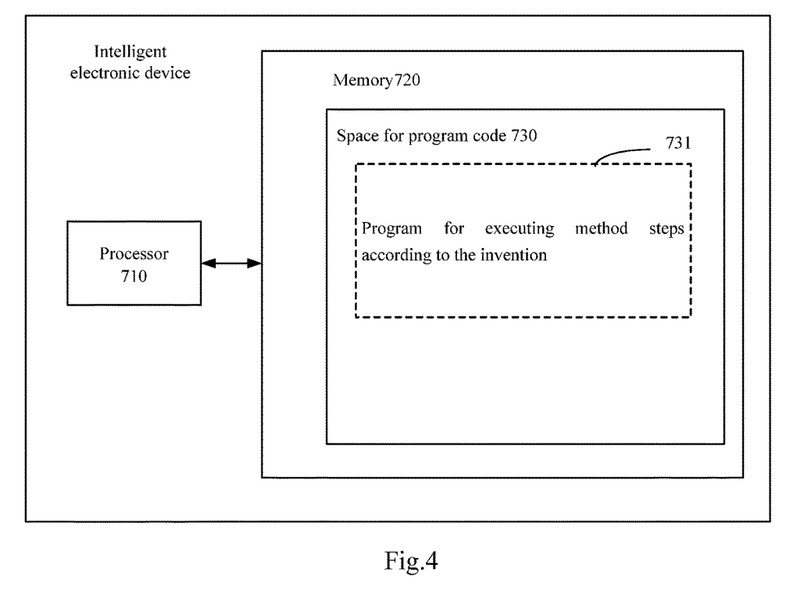
FIG. 4 shows schematically an intelligent electronic device which may implement the invention.

For example, FIG. 4 shows an intelligent electronic device which may carry out a scanning method or a cloud management method for checking and killing a malicious program or a method for scanning a malicious program based on cloud security according to the invention. The intelligent electronic device traditionally comprises a processor 710 and a computer program product or a computer readable medium in the form of a memory 720. The memory 720 may be an electronic memory such as a flash memory, an EEPROM (electrically erasable programmable read-only memory), an EPROM, a hard disk or a ROM. The memory 720 has a memory space 730 for a program code 731 for carrying out any method steps in the methods as described above. For example, the memory space 730 for a program code may comprise individual program codes 731 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 5. The storage unit may have a memory segment, a memory space, etc. arranged similarly to the memory 720 in the intelligent electronic device of FIG. 4.

Figure 5:
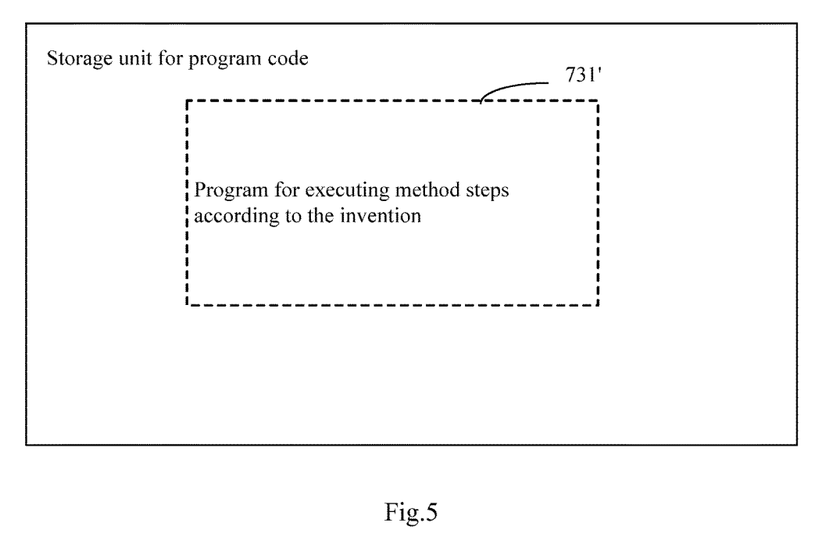
FIG. 5 shows schematically a storage unit for retaining or carrying a program code implementing a method according to the invention.

The program code may for example be compressed in an appropriate form. In general, the storage unit comprises a program 731' for executing method steps according to the invention, i.e., a code which may be read by e.g., a processor such as 710, and when run by an intelligent electronic device, the codes cause the intelligent electronic device to carry out individual steps in the methods described above.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. does not mean any ordering. Such words may be construed as naming.

This document discloses: A1: A scanning device for checking and killing a malicious program comprising: a first transmission interface configured to transmit information to a server-side device and receive information transmitted by the server-side device; an environment information reader configured to read current system environment information of a client device and transmit it to the server-side device via the first transmission interface; a first scanner configured to obtain via the first transmission interface a first scanning content indication judged by the server-side device at least based on the system environment information, scan a specified position in the first scanning content indication, and at least transmit feature data of an unknown program file obtained by scanning to the server-side device via the first transmission interface; and a second scanner configured to obtain via the first transmission interface a second scanning content indication transmitted by the server-side device, the second scanning content indication comprising scanning a specified attribute of the unknown program file and/or a specified attribute of the contextual environment of the unknown program file, and scan according to the second scanning content indication. A2: The scanning device as claimed in A1, wherein the second scanner is further configured to transmit via the first transmission interface the scanning result after scanning according to the second scanning content indication to the server-side device; and the scanning device further comprises: a first fixer configured to obtain via the first transmission interface a fixing logic determined by the server-side device based on the scanning result provided by the second scanner, and perform a fixing processing for the unknown program file according to the fixing logic. A3: The scanning device as claimed in A1, further comprising: a second fixer configured to obtain via the first transmission interface a fixing logic from the server-side device related to the second scanning content indication and transmitted together with the second scanning content indication, and perform a fixing processing for the unknown program file when the scanning result of the second scanner meets the fixing logic. A4: The scanning device as claimed in A2 or A3, wherein the fixing processing comprises one or more of the following processing ways: deleting a specified registry key and/or key value, modifying a registry key and/or key value as specified content, deleting a specified system service item, and fixing/deleting a specified program file. A5: The scanning device as claimed in any one of A1 to A4, wherein the system environment information comprises one or more of the following: the version information of an operating system, system patch installation information, software installation information, driver installation information, information on a process and service running in the system. A6: The scanning device as claimed in any one of A1 to A5, wherein the feature data of the program file comprises one or more of the following: the data obtained employing a specific algorithm for all or part of the key content of the unknown program file and the file name; and the specified attribute of the unknown program file comprises one or more of the following: feature data, file size, security level, signature information and version information. A7: The scanning device as claimed in any one of A1 to A6, wherein the attribute of the contextual environment of the unknown program file comprises one or more of the following: information on a directory where the unknown program file is located, information on a startup position in a registry, attribute information of other file under the same directory as the program file or a specified directory, and the running state of a specified process.

This document discloses: B8: A cloud management device for checking and killing a malicious program comprising: a second transmission interface configured to transmit information to a client device and receive information transmitted by the client device; a first indicator configured to generate a first scanning content indication according to characteristics of a newborn malicious program and system environment information transmitted by the client device, the first scanning content indication at least comprising scanning content at a specified position and notifying scanned feature data of an unknown program file, and transmit the first scanning content indication to the client device via the second transmission interface; a first matcher configured to obtain via the second transmission interface feature data of the unknown program file transmitted by the client device, and hereby perform matching in known records of feature data of malicious programs; and a second indicator configured to generate a second scanning content indication when the first matcher fails to match to a known record, the second scanning content indication comprising scanning a specified attribute of the unknown program file and/or a specified attribute of the contextual environment of the unknown program file, and transmit the same to the client device via the second transmission interface. B9: The cloud management device as claimed in B8, wherein the second indicator is further configured to obtain via the second transmission interface the scanning result obtained by the client device after scanning according to the second scanning content indication, judge hereby whether the unknown program file is a malicious program and transmit the judgment result to the client device via the second transmission interface; or the second indicator is further configured to transmit a judgment logic related to the second scanning content indication together to the client device via the second transmission interface, which judgment logic is a logic for judging whether the unknown program file is a malicious program. B10: The cloud management device as claimed in B9, wherein the second indicator is further configured to perform matching in a known database for checking and killing malicious programs according to the scanning result obtained by the client device after scanning according to the second scanning content indication, and if a fixing logic matching the scanning result is found, transmit it to the client device via the second transmission interface; or, the second indicator is further configured to perform matching in a known database for checking and killing malicious programs according to the second scanning content indication, and transmit a matched fixing logic related to the second scanning content indication together with the second scanning content indication to the client device via the second transmission interface. B11: The cloud management device as claimed in any one of B8 to B10, wherein the characteristics of a newborn malicious program comprise: feature information in which the newborn malicious program utilizes a specific position to hide and/or attack. B12: The cloud management device as claimed in any one of B8 to B11, wherein the first scanning content indication is an indication with a condition attached, and the condition comprises one or more of the following: whether a specified file exists, whether a specified directory exists, whether an attribute of a program file meets a specified condition, whether a specified registry key exists, whether a specified registry key value exists, whether content of a registry key meets a specified condition, whether content of a registry key value meets a specified condition, whether a specified process exists, and whether a specified service exists. B13: The cloud management device as claimed in any one of B8 to B12, wherein the fixing logic comprises one or more of the following logics: deleting a specified registry key and/or key value, modifying a registry key and/or key value as specified content, deleting a specified system service item, and fixing/deleting a specified program file. B14: The cloud management device as claimed in any one of B8 to B13, wherein the feature data of the unknown program file comprises one or more of the following: the data obtained employing a specific algorithm for all or part of the key content of the unknown program file and the file name; and the specified attribute of the unknown program file comprises one or more of the following: feature data, file size, signature information and version information. B15: The cloud management device as claimed in any one of B8 to B14, wherein the attribute of the contextual environment of the unknown program file comprises one or more of the following: information on a directory where the unknown program file is located, security level information, information on a startup position in a registry, attribute information of other file under the same directory as the program file or a specified directory, and the running state of a specified process.

This document discloses: C16: A system for scanning a malicious program based on cloud security comprising a scanning device for checking and killing a malicious program as claimed in any one of A1 to A7 and a cloud management device for checking and killing a malicious program as claimed in any one of B8 to B15.

This document discloses: D17: A scanning method for checking and killing a malicious program comprising: reading current system environment information of a client device, and transmitting it to a server-side device; obtaining a first scanning content indication judged by the server-side device based on the system environment information, scanning a specified position in the first scanning content indication, and transmitting at least feature data of an unknown program file obtained by scanning to the server-side device; and obtaining a second scanning content indication transmitted by the server-side device, the second scanning content indication comprising scanning a specified attribute of the unknown program file and/or a specified attribute of the contextual environment of the unknown program file, and scanning according to the second scanning content indication. D18: The scanning method as claimed in D17, further comprising: transmitting the scanning result after scanning according to the second scanning content indication to the server-side device; obtaining the judgment result of whether the unknown program file is a malicious program determined by the server-side device based on the scanning result, and performing a corresponding processing according to the judgment result; or obtaining a judgment logic related to the second scanning content indication notified by the server-side device, determining whether the unknown program file is a malicious program according to the scanning result after scanning according to the second scanning content indication and the judgment logic, and performing a corresponding processing.

This document discloses: E19: A cloud management method for checking and killing a malicious program comprising: generating a first scanning content indication according to characteristics of a newborn malicious program and system environment information transmitted by a client device, the first scanning content indication at least comprising scanning content at a specified position and notifying scanned feature data of an unknown program file, and transmitting the first scanning content indication to the client device; obtaining feature data of the unknown program file transmitted by the client device, and hereby performing matching in a known database for checking and killing malicious programs; and generating a second scanning content indication when a known record fails to be matched to the feature data of the unknown program file, the second scanning content indication comprising scanning a specified attribute of the unknown program file and/or a specified attribute of the contextual environment of the unknown program file, and transmitting the second scanning content indication to the client device. E20: The cloud management method as claimed in E19, further comprising: obtaining the scanning result obtained after the client device scans according to the second scanning content indication, judging hereby whether the unknown program file is a malicious program, and transmitting the judgment result and/or a fixing logic matching the scanning result to the client device; or transmitting a judgment logic and/or a fixing logic related to the second scanning content indication together with the second scanning content indication to the client device.

This document discloses: F21: A method for scanning a malicious program based on cloud security comprising: a client device reading current system environment information and transmitting it to a server-side device; the server-side device generating a first scanning content indication according to characteristics of a newborn malicious program and the system environment information transmitted by the client device, the first scanning content indication at least comprising scanning content at a specified position and notifying scanned feature data of an unknown program file, and transmitting the first scanning content indication to the client device; the client device scanning according to the first scanning content indication, and at least transmitting feature data of the unknown program file obtained by scanning to the server-side device; the server-side device performing matching in a known database for checking and killing malicious programs according to the feature data of the unknown program file; the server-side device generating a second scanning content indication when a known record fails to be matched to the feature data of the unknown program file, the second scanning content indication comprising scanning a specified attribute of the unknown program file and/or a specified attribute of the contextual environment of the unknown program file, and transmitting the second scanning content indication to the client device; and the client device scanning according to the second scanning content indication.

The invention claimed is:

1. A scanning device for checking and killing a malicious program comprising:
    a first transmission interface to transmit, by a processor, information to a server-side device and receive information transmitted by the server-side device;
    an environment information reader to read, by the processor, current system environment information of a client device and transmit the current system environment information to the server-side device via the first transmission interface;
    a first scanner to obtain, by the processor, via the first transmission interface a first scanning content indication determined by the server-side device at least based on the system environment information, scan a specified position in the first scanning content indication, and at least transmit feature data of an unknown program file obtained by scanning to the server-side device via the first transmission interface;
    a second scanner to obtain, by the processor, via the first transmission interface a second scanning content indication transmitted by the server-side device, the second scanning content indication comprising scanning a specified attribute of the unknown program file and/or a specified attribute of a contextual environment of the unknown program file, scan according to the second scanning content indication, and transmit via the first transmission interface a scanning result after the scanning according to the second scanning content indication to the server-side device; and
    a first fixer to obtain via the first transmission interface a fixing logic determined by the server-side device based on the scanning result provided by the second scanner, and perform a fixing processing for the unknown program file according to the fixing logic.

2. The scanning device as claimed in claim 1, wherein the fixing processing comprises one or more of the following:
    deleting a specified registry key and/or key value, modifying a registry key and/or key value as specified content, deleting a specified system service item, and fixing/deleting a specified program file.

3. The scanning device as claimed in claim 1, wherein the system environment information comprises one or more of the following:
    version information of an operating system, system patch installation information, software installation information, driver installation information, information on a process and service running in the system.

4. The scanning device as claimed in claim 1, wherein
    the feature data of the unknown program file comprises one or more of the following: data obtained employing a specific algorithm for all or part of key content of the unknown program file and file name; and
    the specified attribute of the unknown program file comprises one or more of the following: feature data, file size, security level, signature information and version information.

5. The scanning device as claimed in claim 1, wherein the attribute of the contextual environment of the unknown program file comprises one or more of the following:
    information on a directory where the unknown program file is located, information on a startup position in a registry, attribute information of another file under a same directory as the program file or a specified directory, and a running state of a specified process.

6. A scanning method for checking and killing a malicious program comprising:

reading, by a processor, current system environment information of a client device, and transmitting the current system environment information to a server-side device;

obtaining, by the processor, a first scanning content indication determined by the server-side device based on the system environment information, scanning a specified position in the first scanning content indication, and transmitting at least feature data of an unknown program file obtained by scanning to the server-side device;

obtaining, by the processor, a second scanning content indication transmitted by the server-side device, the second scanning content indication comprising scanning a specified attribute of the unknown program file and/or a specified attribute of a contextual environment of the unknown program file, and scanning according to the second scanning content indication; and transmitting a scanning result after the scanning according to the second scanning content indication to the server-side device and one of: (1) obtaining a determined result of whether the unknown program file is a malicious program determined by the server-side device based on the scanning result, and performing a corresponding processing according to the determined result and (2) obtaining a determined logic related to the second scanning content indication notified by the server-side device, determining whether the unknown program file is a malicious program according to the scanning result after the scanning according to the second scanning content indication and the determined logic, and performing a corresponding processing.

* * * * *